(12) United States Patent
Lane et al.

(10) Patent No.: US 10,180,327 B1
(45) Date of Patent: *Jan. 15, 2019

(54) METHODS AND APPARATUS FOR NAVIGATIONAL AIDING USING CELESTIAL OBJECT TRACKING

(71) Applicant: The Charles Stark Draper Laboratory, Inc., Cambridge, MA (US)

(72) Inventors: Benjamin F. Lane, Sherborn, MA (US); William W. Whitacre, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,714

(22) Filed: Jun. 5, 2017

Related U.S. Application Data

(63) Continuation of application No. 15/152,104, filed on May 11, 2016, now Pat. No. 9,702,702.

(Continued)

(51) Int. Cl.
| | |
|---|---|
| *G01C 21/02* | (2006.01) |
| *G06K 9/00* | (2006.01) |
| *G06T 7/20* | (2017.01) |
| *G06T 7/277* | (2017.01) |
| *G06T 7/207* | (2017.01) |
| *G06T 7/215* | (2017.01) |

(52) U.S. Cl.
CPC ......... *G01C 21/025* (2013.01); *G06K 9/0063* (2013.01); *G06T 7/207* (2017.01);
(Continued)

(58) Field of Classification Search
CPC .. G01C 21/025; G06K 9/0063; G06T 7/0044; G06T 7/204; G06T 7/208;
(Continued)

(56) References Cited

U.S. PATENT DOCUMENTS

| | | |
|---|---|---|
| 5,109,346 A | 4/1992 | Wertz |
| 5,477,459 A | 12/1995 | Clegg et al. |

(Continued)

OTHER PUBLICATIONS

Blackman, "Multiple Hypothesis Tracking for Multiple Target Tracking," *Aerospace and Electronic Systems Magazine, IEEE*, vol. 19, No. 1, pp. 5-18 (Jan. 2004).

(Continued)

*Primary Examiner* — Jon Chang
(74) *Attorney, Agent, or Firm* — Sunstein Kann Murphy & Timbers LLP

(57) ABSTRACT

Methods and computer products for establishing at least one of attitude, direction and position of a moving platform. At least one skymark of known ephemeris is imaged at each of a first set of discrete instants by means of an optical sensor coupled to the platform. A measurement is also obtained of the attitude of the platform at each of a second set of discrete instants by means of an inertial navigation system. A recursive of estimation filter is then applied to successive skymark position vectors to update an estimate of platform navigation state, with the measurement of attitude of the platform tightly coupled to the estimate of platform navigation state as updated by the recursive estimation filter. Various techniques of frame stacking and multi-hypothesis tracking may be applied to improve the robustness of navigation solutions.

19 Claims, 6 Drawing Sheets

Related U.S. Application Data

(60) Provisional application No. 62/278,133, filed on Jan. 13, 2016, provisional application No. 62/175,896, filed on Jun. 15, 2015.

(52) U.S. Cl.
CPC .............. *G06T 7/215* (2017.01); *G06T 7/277* (2017.01); *G06T 2207/10032* (2013.01); *G06T 2207/20024* (2013.01); *G06T 2207/30241* (2013.01)

(58) Field of Classification Search
CPC . G06T 2207/10032; G06T 2207/20024; G06T 2207/30241; G06T 7/207; G06T 7/215; G06T 7/277
USPC ........................................................ 382/103
See application file for complete search history.

(56) References Cited

U.S. PATENT DOCUMENTS

| | | | |
|---|---|---|---|
| 5,508,932 | A | 4/1996 | Achkar et al. |
| 5,546,309 | A | 8/1996 | Johnson et al. |
| 8,472,735 | B2 | 6/2013 | Lane et al. |
| 8,767,072 | B1 * | 7/2014 | Rosenwinkel ....... G01C 21/025 348/148 |
| 9,073,648 | B2 | 7/2015 | Tsao et al. |
| 9,217,643 | B1 | 12/2015 | Belenkii et al. |
| 9,702,702 | B1 * | 7/2017 | Lane .................... G01C 21/025 |
| 2009/0177398 | A1 | 7/2009 | Belenkii et al. |
| 2012/0249775 | A1 | 10/2012 | Paluszek et al. |
| 2014/0316698 | A1 | 10/2014 | Roumeliotis et al. |
| 2014/0340522 | A1 | 11/2014 | Dawson et al. |

OTHER PUBLICATIONS

Blom et al., "The Interacting Multiple Model Algorithm for Systems with Markovian Switching Coefficients," *IEEE Trans. Auto. Control*, vol. 33, No. 8, pp. 780-783 (Aug. 1988).

Brown et al., "Long Duration Strapdown Stellar-Inertial Navigation Using Satellite Tracking," *Position Location and Navigation Symposium, 1992, Record 500 Years after Columbus-Navigation Challenges of Tomorrow, IEEE Plans '92*, pp. 194-201 (1992).

Brunke et al., "Square Root Sigma Point Filtering for Real-Time, Nonlinear Estimation," *J. Guidance*, vol. 27, No. 2, pp. 314-317 (2004).

De Ward, "Chapter 2: Basic methods for Data Association," *A New Approach to Distributed Data Fusion*, Thesis, pp. 15-42 (2008).

Julier et al., "A New Extension of the Kalman Filter to Nonlinear Systems," *AeroSense '97*, International Society for Optics and Photonics, pp. 182-193 (1997).

Kaptuch, "Skymark Selection Algorithm for a Space-Based Navigational Concept," Master of Engineering in Aeronautics and Astronautics at the Massachusetts Institute of Technology, 161 pages (Sep. 2002).

Kjørsvik et al., "Tightly Coupled Precise Point Positioning and Inertial Navigation Systems," *International Calibration and Orientation Workshop EuroCOW*, 6 pages (2010).

Konstantinova et al., "A Study of a Target Tracking Algorithm Using Global Nearest Neighbor Approach," *Proceedings of the International Conference on Computer Systems and Technologies— (CompSysTech '03)*, 6 pages (2003).

Samaan et al., "Predictive Centroiding for Single and Multiple FOVs Star Trackers," *Texas A&M University, Department of Aerospace Engineering*, 13 pages (2002).

Schmidt, "Analysis of Square-Root Kalman Filters for Angles-Only Orbital Navigation and the Effects of Sensor Accuracy on State Observability," *Utah State University*, Masters Thesis in Aerospace Engineering, 165 pages (2010).

Tappe, "Development of Star Tracker System for Accurate Estimation of Spacecraft Attitude," *US Navy Postgraduate School*, Masters Thesis, 108 pages (2009).

Willhite, "An Analysis of ICBM Navigation Using Optical Observations of Existing Space Objects," *Massachusetts Institute of Technology*, Department of Aeronautics and Astronautics, Masters Thesis, 123 pages (2004).

Williams, "Coupling Between Nonlinear Estimation and Dynamic Sensor Tasking Applied to Satellite Tracking," The Pennsylvania State University, The Graduate School, Dissertation, 207 pages, (Dec. 2012).

* cited by examiner

METHODS AND APPARATUS FOR NAVIGATIONAL AIDING USING CELESTIAL OBJECT TRACKING

RELATION TO PRIOR APPLICATIONS

The present application is a continuation of U.S. patent application Ser. No. 15/152,104, filed May 11, 2016 and now issued as U.S. Pat. No. 9,702,702, and, through that application, claims priority from two provisional patent applications, U.S. Provisional Application Ser. No. 62/175,896, filed Jun. 15, 2015, and U.S. Provisional Application Ser. No. 62/278,133, filed Jan. 13, 2016. All of the foregoing applications are incorporated herein by reference.

STATEMENT REGARDING FEDERALLY SPONSORED RESEARCH OR DEVELOPMENT

This invention was made with government support under contract number W911QY-13-D-0100 awarded by the United States Department of the Air Force. The U.S. Government has certain rights in the invention.

TECHNICAL FIELD

The present invention relates to navigational aiding using celestial object tracking and, more particularly, to improved methods and apparatus for deriving a navigational state of a platform based upon a combination of celestial tracking and inertial measurement.

BACKGROUND ART

Celestial sightings provide information that can be used to derive platform attitude, direction, and position. Celestial navigation techniques have been in use since ancient times, with stars originally providing direction information to voyagers, e.g., Polaris. Until the 1950s, the elevation angles would be measured against a vertical reference provided by the horizon at sea. Subsequent mechanizations of the process rely on inertial instruments to maintain knowledge of the local vertical when the horizon is obscured or when the measurement is done from a moving platform such as an aircraft. However, inherent drift of inertial sensors limits accuracy of the vertical measurement, and ultimately system performance.

It has long been known that it is possible to derive one's position by observing an orbiting satellite against a star-field background. Angles between an apparent position of the satellite and (assumed known) stars contain information on the location of the observer. This method requires the position of the satellite be known accurately. Given that satellite orbits can be predicted using well-known physical equations, e.g., Kepler's and Newton's laws, this technique can provide a practical method of navigation.

A technique, dubbed "SkyMark," was developed at The Charles Stark Draper Laboratory, Inc. ("Draper") four decades ago and has been closely investigated since then for use in a variety of applications, including autonomous spacecraft navigation. FIG. 1 schematically illustrates principles of operation of SkyMark. Draper has been a pioneer in SkyMark with published works on SkyMark that include a Draper Fellow Master's MIT thesis (Willhite, W. B., *An Analysis of ICBM Navigation Using Optical Observations of Existing Space Objects*, CSDL-T-1484, Masters Thesis, Massachusetts Institute of Technology, June 2004, the entire contents of which are hereby incorporated by reference), and in Shearer, J., et al., "*SkyMark—A Technique for Enhancing Precision Missile Navigation,*" AIAA Missile Sciences Conf., (November, 2004), which is also incorporated herein by reference.

As depicted in FIG. 1, a star tracker (not shown in FIG. 1) associated with a vehicle 100 is used to measure a direction (indicated by ray 102) toward a celestial object 104 (in the case shown, a fixed star) and a direction $R_1$ toward a skymark 106 at one or more instants of time, noting that the terms "star" and "skymark" are defined below. The angle between the two directions 102 and $R_1$ is designated $\theta$. A star tracker may use information in a star catalog to locate itself, and its associated vehicle, in space.

The concept of using satellite sightings together with inertial guidance for navigation purposes was discussed by Brown et al. in "*Long Duration Strapdown Stellar-Inertial Navigation using Satellite Tracking,*" Position Location and Navigation Symposium, 1992. Record. 500 Years after Columbus-Navigation Challenges of Tomorrow. IEEE PLANS'92, IEEE, pp. 194-201 (1992), which is incorporated herein by reference.

While the concept of using satellite sightings for ownship positioning is known, improved methods and apparatus for collecting data, processing the data and integrating such methods and apparatus into complete navigational solutions are needed to overcome limitations imposed by the paucity of trackable objects subject to operational conditions. Thus, using methods that are currently known, requisite accuracy cannot be achieved under certain conditions.

SUMMARY OF EMBODIMENTS OF THE INVENTION

In accordance with embodiments of the present invention, methods are provided for establishing at least one of attitude, direction and position of a platform in motion in an inertial frame. One method has steps of:

optically imaging at least one skymark of known ephemeris at each of a first set of discrete instants by means of a sensor coupled to the platform to obtain successive skymark position vectors;

obtaining a measurement of attitude of the platform at each of a second set of discrete instants by means of an inertial navigation system; and applying a recursive estimation filter to successive skymark position vectors to update an estimate of platform navigation state, wherein the measurement of attitude of the platform is tightly coupled to the estimate of platform navigation state as updated by the recursive estimation filter.

In accordance with alternate embodiments of the invention, the second set of discrete instants may substantially overlap the first set of discrete instants. The recursive estimation filter may be a Kalman filter, and, more particularly, an unscented Kalman filter.

In accordance with other embodiments, one or more skymarks may be satellites. The recursive estimation filter may employ multi-hypothesis tracking, which, more particularly, may include retaining multiple hypotheses regarding assignment of bright spots to skymarks during recursive estimation.

In accordance with further embodiments of the present invention, the step of optically imaging may include frame stacking of successive images. The successive images may be spatially shifted based on a predicted motion, such as predicted motion of a skymark, for example. Frame stacking may include compensation for motion of the platform, where the compensation, in turn, may be based, at least in part, on the measurement of attitude of the platform.

In other embodiments, the method may additionally entail separately summing successive image frames in parallel pipelines, wherein a first pipeline compensates for predicted motion and a second pipeline does not compensate for predicted motion. The predicted motion may include motion of a skymark, for example, and/or motion of the platform.

Applying a recursive estimation filter may comprise updating a set of states of a state vector at successive instants, which, in turn, may include updating a proper subset of the set of states of the state vector. Updating the set of states may include appending a state to the state vector and/or deleting a state from the state vector. More particularly, appending a state to the state vector may correspond to entry of a satellite into a specified field of view.

In accordance with yet further embodiments of the invention, the method may have further steps of:
 identifying at least one bright spot detected by the sensor;
 attributing the bright spot to a putative celestial object and employing the estimate of platform navigation state to predict a position of the bright spot in a subsequent image frame provided by the sensor;
 detecting the putative celestial object at a subsequent time; and
 discriminatingly selecting the bright spot as a skymark for purposes of successive applications of the recursive estimation filter based on congruence of an actual position in the subsequent image frame relative to the predicted position.

In accordance with another aspect of the present invention, a method is provided for removing spurious tracker detections of a star or a skymark by a sensor coupled to a platform in motion in an inertial frame. The method has steps of:
 optically imaging a field of view to obtain an image at each of a set of discrete instants by means of the sensor coupled to the platform;
 attributing at least one bright spot in a first of the set of discrete instants to a putative celestial object;
 employing an estimate of platform navigation state to predict a position of the bright spot in a subsequent image frame provided by the sensor;
 comparing the subsequent image frame with the predicted position of the bright spot; and
 removing the bright spot from further consideration based on incongruence of the subsequent image with the predicted position.

In accordance with a further aspect of the present invention, a computer program product is provided for use on a computer system for establishing at least one of attitude, direction and position of a platform in motion in an inertial frame. The computer program product has a computer usable tangible medium with computer readable program code fixed thereon, that includes:
 program code for inputting an image of at least one skymark of known ephemeris at each of a first set of discrete instants by means of a sensor coupled to a platform to obtain successive skymark position vectors;
 program code for inputting a measurement of attitude of the platform at each of a second set of discrete instants; and
 a recursive estimation filter adapted to update an estimate of platform navigation state,
wherein the measurement of attitude of the platform is tightly coupled to the estimate of platform navigation state as updated by the recursive estimation filter.

In other embodiments of the invention, the recursive estimation filter may be a Kalman filter, and may also employ multi-hypothesis tracking. In the latter case, the multi-hypothesis tracking may include retaining multiple hypotheses regarding assignment of bright spots to skymarks during recursive estimation.

In yet further embodiments of the invention, optically imaging may include frame stacking of successive images, and, more particularly, the successive images may be spatially shifted based on a predicted motion. Additionally, the computer program product may also have program code for separately summing successive image frames in parallel pipelines, wherein a first pipeline compensates for predicted motion and a second pipeline does not compensate for predicted motion.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Definitions

Figure 1:
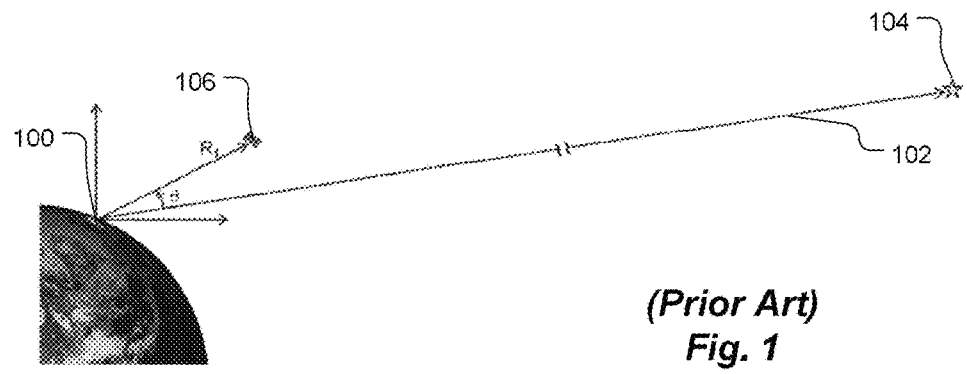
FIG. 1 is a schematic diagram illustrating principles of operation of SkyMark navigation, according to the prior art.

As the term is used herein and in any appended claims, the term "skymark" shall refer to any object that meets all three of the following criteria:
 It is in a known and predictable location, which is tantamount to knowledge, by an observer, of an ephemeris of sufficient accuracy for purposes of the observer.
 It appears to the observer with sufficient brightness as to be readily detectable and trackable; and
 It is sufficiently close to the observer as to exhibit parallax over a period of observation by the observer during which the observer is in motion.

A star is so far away that it does not satisfy the last of the forgoing criteria and, while it may serve as a direction reference, a star cannot provide a location reference. A skymark in orbit with a known ephemeris may be used for determining a location based on sighting of the object. Multiple sightings on skymarks are required for determination of multi-dimensional location in space. Although conventional star trackers typically use navigational stars, other light-emitting or light-reflecting space objects can be used for navigation. For example, most artificial satellites have predictable orbits or other trajectories and can, therefore, be used instead of, or in addition to, stars for navigation.

The term "inertial frame" shall denote a fiducial coordinate frame of reference in which a body at rest remains at rest unless acted upon by a force. When a body is said to be in motion in an inertial frame, it shall be understood that, within the scope of the present invention, motion of the body may be specified within any inertial frame.

The term "navigation state vector," as the term is used herein and in any appended claims, shall refer to the position, velocity and orientation of a specified platform relative to a specified frame of reference.

"State variables" are variables in a vector space in which a recursive filter operates. State variables may include components of the navigation state vector, and measures of errors in one or more of the components, as well as variables such as the directions to celestial objects within the field of view of a camera, etc.

The term "platform" may be used herein interchangeably with the term "vehicle".

"Navigation" is a defined term that refers exclusively to a process for ascertaining at least one of the position, velocity and orientation of a specified platform relative to a specified frame of reference.

The term "attitude" refers to the orientation of a platform relative to an inertial frame. The attitude need not be absolute and may be expressed differentially, relative to a fiducial attitude.

The term "star," as used herein and in any appended claims, shall refer to a point source, i.e., a source of light that is not amenable to spatial resolution by a given optical system, and that is fixed relative to an inertial frame. "Light" is used in a general sense to refer to electromagnetic radiation, whereas "optical" is used in a correspondingly broad sense, unless the context requires otherwise. Thus, for example, "optical" may encompass sensing or processing of visible, infrared, and/or ultraviolet light.

A "satellite" is defined to be a body, natural or artificial, that is gravitationally bound to another body of greater mass.

Insofar as the ephemeris of a satellite is known, and in cases where a satellite meets the other two skymark criteria defined above, a satellite shall constitute a skymark.

Since a star is too distant for any parallax to be useful in a navigational context, a star is distinct from a skymark, as those terms are used herein.

An object shall be referred to "celestial" with respect to a specified platform that is in motion relative to the surface of a specified body (such as the Earth or other planet), if, and only if, the object is substantially further from the center of mass of the specified body than its surface. Thus, on the Earth, a celestial body is any object seen from the surface of the Earth by looking above the horizon. A celestial body need not be a natural object.

The term "recursive estimation filter," as used herein and in any appended claims, shall denote any recursive estimation algorithm in which estimates of one or more random variables (constituting a state vector in the aggregate), and an uncertainty associated with each random variable, are iteratively updated upon each of a temporal sequence of successive measurements. The general tenets of recursive estimation methods, and the terms used in connection therewith, may be found in Bar-Shalom et al., *Estimation with Applications to Tracking and Navigation: Theory Algorithms and Software* (Wiley, 2001) (hereinafter, "Bar-Shalom 2001), which is incorporated herein by reference. Another useful reference is Williams, *Coupling between Nonlinear Estimation and Dynamic Sensor Tasking Applied to Satellite Tracking*, Penn. State U. Ph.D. Dissertation (2012), which is incorporated herein by reference.

The term "instant," as the term is used herein and in any appended claims, shall refer to a finite duration of time during which one or more parameters are measured. Such measurements may be ascribed to a point in time for computational convenience, without loss of generality.

The term "Kalman filter," as used herein and in any appended claims, shall be used in a broad sense, encompassing extended Kalman filters as well, shall denote a recursive estimation filter where a state vector $x_k$ at time k is assumed only to be a general (and not necessarily linear) function $f(x_{k-1}, u_k)$ of the state vector $x_{k-1}$ at the immediately preceding discretely sampled time k−1 and a control vector $u_k$, modulo an additive noise term that is assumed to be drawn from a multivariate normal distribution. As the term is used herein, the system dynamics and observation models are not necessarily limited, as required by a narrower usage of the term "Kalman filter."

The term "unscented Kalman filter" shall refer to a method for applying Kalman filtering to nonlinear systems without linearizing nonlinearities but by means of an "unscented transform" for calculating the statistics of a random variable undergoing a nonlinear transformation, as taught by Julier et al., "*A New Extension of the Kalman Filter to Nonlinear Systems,*" AeroSense'97. *International Society for Optics and Photonics*, pp. 182-93, (1997) ("Julier 1997"), which is incorporated herein by reference. As used herein, the term "unscented transform" shall refer to any deterministic selection of points for establishing the transform of the state error covariance matrix.

The term "tightly coupling" shall refer to integration of aiding measurements directly into a unitary recursive estimation filter, whereas "loosely coupling" shall refer to processing of the aiding measurements in a separate recursive estimation filter, and their post-filtered incorporation into the recursive estimation filter applied to a primary random state vector. Thus, for example, measurements derived from an inertial navigation systems (INS) may either be tightly coupled, or loosely coupled, to global positioning satellite (GPS) data, as taught, for example, by Kjørsvik, et al., "*Tightly coupled precise point positioning and inertial navigation systems,*" International calibration and orientation workshop EuroCOW, (2010), which is incorporated herein by reference.

As used herein and in any appended claims, the term "Global Nearest Neighbor" (GNN) shall refer to any method of data association for associating measurements with identified targets in which all possible measurement-to-track pairings are considered whereupon the most likely assignment hypothesis is chosen irrevocably. GNN methods are used in radar, infrared or sonar tracking modalities, and are described by Blackman, "*Multiple hypothesis tracking for multiple target tracking,*" Aerospace and Electronic Systems Magazine, IEEE, vol. 19, pp. 5-18 (2004) (hereinafter, "Blackman 2004"), which publication is incorporated by reference herein.

In certain embodiments that fall within the scope of the present invention, other data association methods may be used advantageously to associate measurements with identified targets. Various data association methods, including GNN and multi-hypothesis tracking (MHT) are described by Blackman et al., *Design and Analysis of Modern Tracking Systems*, Artech House (2009) (hereinafter, "Blackman & Popoli 2009"), incorporated herein by reference.

The term "multi-hypothesis tracking" (or "Reid's algorithm"), as used herein and in any appended claims, shall refer to any tracking algorithm in which multiple solution branches are retained and a set (possibly including either a proper subset or the entire set) of solution branches is updated during each discrete sensor dwell, and solutions may subsequently be pruned applying any of a variety of pruning criteria, as described below.

More particularly, the term "multi-hypothesis tracking" encompasses the use of multiple navigation hypotheses, wherein multiple hypothesis of bright spots to star/satellite assignments are retained in case one or more of them is wrong.

An inertial navigation system (INS) is any sensor or combination of sensors used for measuring attitude (differential or absolute) of a platform relative to an inertial frame. Inertial navigation systems may employ accelerometers, where the term "accelerometers" is used in the most general sense and encompasses gyroscopes for the measurement of rotation.

A "subset," as used herein and in any appended claims, shall refer either to a non-empty proper subset of a specified set, or to the entirety of the specified set.

The term "image" shall refer to any multidimensional representation, whether in tangible or otherwise perceptible form, or otherwise, whereby a value of some characteristic (typically intensity) is associated with each of a plurality of locations corresponding to dimensional coordinates of an object with respect to a sensor array, though not necessarily mapped one-to-one thereonto. Thus, for example, the graphic display of the spatial distribution of some field, either scalar or vectorial, such as intensity, constitutes an image. So, also, does an array of numbers, such as an N-dimensional holographic dataset, in a computer memory or holographic medium. Similarly, "imaging" refers to the rendering of a stated physical characteristic in terms of one or more images.

A "frame" shall constitute an image associated with a specified instant or duration of time.

"Frame stacking," as the term is used herein and in any appended claims, shall refer to any algorithm used to co-process multiple images obtained at non-identical times. Co-processing may include averaging, in the broadest sense, or other manipulation of registered images.

In accordance with embodiments of the present invention, improved methods and apparatus are disclosed for collecting data, processing the data and integrating such methods and apparatus into complete navigational solutions, in relation to acquiring navigational position fixes by observing stars and natural and man-made satellites.

Most artificial satellites, spacecraft and other propelled devices such as aircraft, ship and ground vehicles (collectively referred to herein as vehicles) require information about their locations and/or attitudes to accomplish their missions. This information may be obtained from one or more sources, such as the global positioning system (GPS), ground-based radar tracking stations and/or an on-board star tracker.

A star tracker is an optical device that measures bearing(s) to one or more celestial objects, as viewed from a vehicle. A star tracker typically includes a star catalog that lists bright navigational stars and information about their locations in the sky, sufficient to calculate an attitude of a vehicle in space, given bearings to several stars. A conventional star tracker includes a lens that projects an image of a star onto a photocell, or that projects an image of one or more stars onto a light-sensitive sensor array (digital camera).

The term "tracker" may be used herein more generally than the term "star tracker," and may encompass devices that follow and process features within a field of view from frame to frame.

One type of star tracker is "strapped-down," meaning its view angle, relative to its vehicle, is fixed. Another type of star tracker can be aimed mechanically, such as in a direction in which a navigational star is expected to be seen. Using data from the photocell or sensor array, the star catalog and information about the star tracker's view angle, relative to the vehicle, the star tracker calculates a position of the vehicle in space.

Strapped-down star trackers are mechanically simpler than mechanically aimable star trackers. However, the fixed view angle of a strapped-down star tracker limits the number of navigational stars that may be used. Mechanically aimable start trackers can use a larger number of navigational stars. However, aiming a prior art star tracker, relative to its vehicle, with the required precision poses substantial problems. In either case, preventing stray light, such as from the sun or reflected from the moon, reaching the photocell or sensor array is challenging, particularly when a navigational star of interest is apparently close to one of these very bright objects.

As has been noted, a star tracker measures bearing(s) to one or more navigational stars and/or other celestial objects and may use information in a star catalog to locate itself, and its associated vehicle, in space. However, instead of imaging a navigational star through clear space, a star tracker may image the navigational star (or other celestial body) through an atmospheric limb of the earth. A "limb" is an apparent visual edge of a celestial body as viewed from space. An "atmospheric limb" is a thin layer near the horizon, as viewed from space, corresponding to an atmosphere. As viewed from space, a star passing behind earth's upper atmosphere appears to shift upward, i.e., away from the center of the earth, from its true position due to refraction of the star's light as the light passes through the atmosphere. The amount of refraction depends on wavelength of the starlight and atmospheric density.

A measurement of the refraction of a known star's light near the horizon can be used to infer a direction, in inertial space, from the measurement point, toward the portion of the atmosphere that refracted the light. A star tracker can directly measure this refraction. Alternatively, a difference in refraction, i.e., dispersion, between two different wavelengths, such as red and blue, of starlight can be measured. This concept is referred to as stellar horizon atmospheric dispersion ("SHAD"). However, it should be noted that these two methods are merely different ways of measuring the same basic phenomenon. The relationship between refraction and dispersion is well known for air. Using measured refraction for inferring direction is called stellar horizon atmospheric refraction ("SHAR"). Artificial satellites can also be sighted through the atmospheric limb, thereby combining SkyMark and stellar horizon atmospheric refraction ("SHAR") and stellar horizon atmospheric dispersion ("SHAD") techniques.

It is to be understood that extension to SHAR or SHAD techniques of methods and apparatus described herein are within the scope of the present invention.

Various embodiments of the present invention are now described with reference to a navigation system, designated generally by numeral 200, depicted schematically and described with reference to FIG. 2. Navigation system 200, in its entirety, serves to combine information derived from tracking celestial objects and information derived from an inertial measurement unit (IMU) to provide navigation solutions with respect to the platform on which the navigation system is deployed.

In general terms, navigation system 200 may be conceptualized in terms of a imager, designated generally by numeral 202, an inertial measurement unit (IMU), designated generally by numeral 204, and a processor, designated generally by numeral 206. Imager 202 may also be referred to herein as an "imaging system" 202, and also as a "celestial sighting system" 202, and, for purposes of the present patent, those terms are synonymous. It is to be understood that the division of structural elements into functional categories is a matter, solely, of heuristic convenience.

A telescope 210 captures light (photons) 212 that are either emitted, reflected or scattered by a celestial object 104 (shown in FIG. 1), and that, prior to impinging upon the telescope, may be directed, by a beam steering mechanism 214, which, within the scope of the present invention, may be a mirror, actuated or otherwise, an electro-optical beam steering device, an actuated pointing mount for the telescope, or any beam steerer now known or later invented. Telescope 210 serves to create an image of the sky at a focal plane where a focal plane array (FPA) 216 of detectors generates a detector signal. More generally, the component referred to as a focal plane array may include attendant optics such as apertures or lenses, and, without loss of generality, may be referred to herein as "camera" 216, or as "the sensor" 216. The word "aperture," as used herein and unless otherwise required by context, shall refer to a physical, field-of-view-defining structure within the optical train.

The signal generated by camera 216, in conjunction with metadata (including a time stamp derived from clock 217) generated by an annotator 218, is captured as successive image frames by frame grabber 220. Time-stamped image data are then processed by image processing software 230 operating on processor 206. It is to be understood that all instantiations of processor 206 are within the scope of the present invention, whether implemented within single or multiple CPUs, or by a general purpose computer, etc. Among other functions, image processing software 230 centroids image data from successive frames to deliver precision coordinates of celestial objects 104 within successive frames to a filter module 240. The aspect of image frame analysis leading to a measure of bearings with respect to one or more celestial objects is referred to herein as a "tracker," as designated generally by numeral 235. Filter module 240 implements a recursive estimation filter, using both image data and inertial data from IMU 204, as discussed herein in detail, and produces a navigation solution 241 (also referred to herein as a "navigation estimate"), which may be used of vehicle guidance and feedback for sensor management 242, again, as further described herein. Filter module 240 may also be referred to herein, without loss of generality, as a "Nav filter" or a "Navigation Filter" 240.

In some embodiments, a long-focal-length telescope 210 is used to acquire a navigational position fix by observing satellites and/or stars. Telescope 210 is optimized for operation in daytime, where the pixel angular scale (instantaneous field of view or IFoV—the spatial angle subtended by a single detector element) is matched to the diffraction limit of the telescope. This limits the overall field of view (FoV) of the optical system to be a very small cone, typically about 1-2 degrees at most, given focal plane arrays 216 that are currently typically available.

In some embodiments of the present invention, telescope 210 is mounted on a gimbal or similar pointable mount, serving as beam-steering mechanism 214 and designed to slew rapidly and follow a satellite as it transits the sky. A computer system, part of processor 206, monitors the direction in which telescope 210 is pointed and compares images acquired against a catalog of known stars. When a calculation determines that a suitable reference stars will pass into the field of view, a data collection system is triggered.

In other embodiments which are not preferred, a telescope 210 with a very wide field of view is employed such that multiple stars are captured in the image. The set of stars falling within the field of view may then be used to determine the pointing direction of the telescope, and, in conjunction with observations of a satellite or other skymark ownship position, as well. However, systems requiring a large field of view are typically precluded from daytime operation.

Another modality of star tracking encompassed within the scope of the present invention includes the use of multiple cameras 216 arrayed to cover a large fraction of the sky. When one or more known celestial objects that may serve to refine the navigation vector is predicted to appear within the field of view of one of the cameras, that camera is triggered and data is acquired and processed.

In accordance with another tracking modality, a moveable mirror (steering mirror) is placed in front of a static telescope 210, and serves as beam steering mechanism 214. Such a moveable mirror is moved it to control the direction of regard of the system so as to capture star/satellite conjunction events, and/or appearance of multiple stars and/or skymarks within a single field of view. The word "conjunction" is used herein in a rigorous astronomical sense to denote the overlap, or partial overlap, of two celestial bodies within a single line of sight as viewed from a specified platform.

Figure 3:
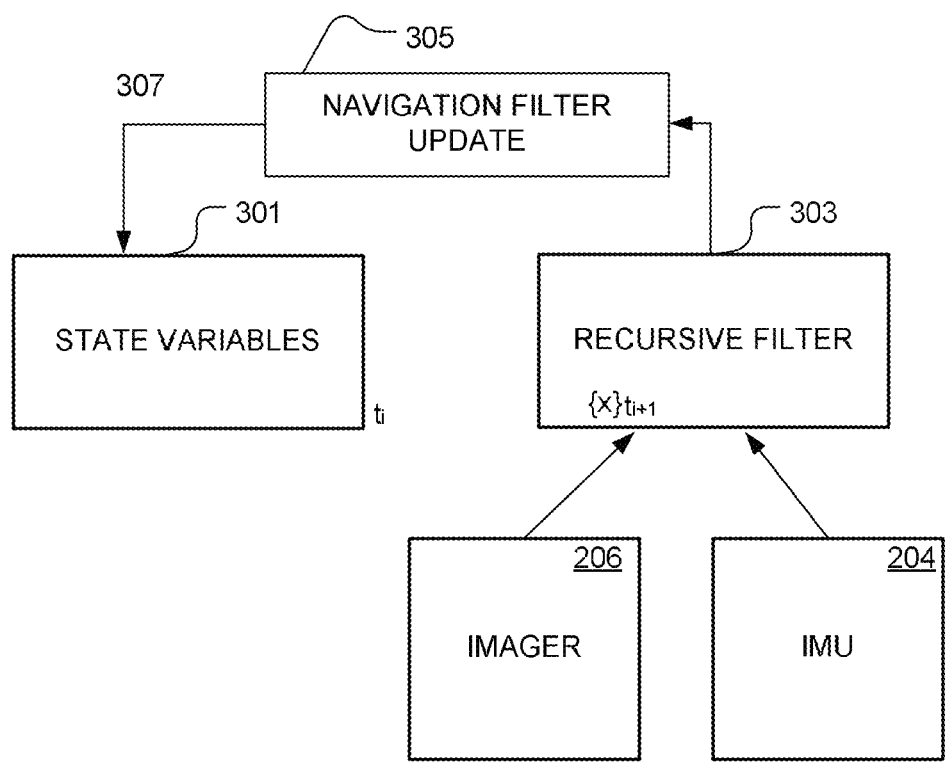
FIG. 3 is a flowchart depicting salient steps in a process of measuring one or more elements of a navigation state vector associated with a specified platform, in accordance with an embodiment of the present invention.

General contours of navigation methods employing certain embodiments of the present invention are now described with reference to the flowchart of FIG. 3. Values of state variables 301, as defined above, are associated with successive time windows, each window corresponding to a sensor dwell. Recursive filter 303 operates on state variables 301, in accordance with algorithms to be described in detail below, yielding a set of estimated state variables at the next discrete increment of time $\{x\}_{t_{j+1}}$. Operation of recursive filter 303 is informed by data derived from IMU 204 and by data acquired by imager 206. An updated set of state variables provided by a Navigation Filter Update 305 is fed back (in step 307) for a successive stage of the recursion filter. Imager data providing positions of at least one skymark at successive times may, but need not be, synchronous with platform attitude data obtained as a second set of discrete instants in order to apply recursive filter 303. Insofar as a unitary recursive filter operates on a set of state variables including both celestial object tracking data and IMU-derived platform attitude data, operation of the recursive filter is said to constitute "tight coupling" of the tracking and attitude data, as defined above.

The measurement of the apparent position of a single reference star or skymark does not fully constrain the telescope attitude. Combining the information from the imaging system 202 with information on vehicle attitude (as provided by an inertial navigation system (INS)) allows for extraction of useful position information. The typical method for doing this type of information fusion is via an Extended Kalman filter (EKF), or an Unscented Kalman Filter. A definitive description of EKF techniques and algorithms may be found in Julier 1997, referenced above, and in references cited therein. By tightly coupling sky imaging data and INS data in the same recursive filter, in accordance with the present invention, it becomes possible to extract useful position information even when only one star, or one skymark, is in the FoV. Earlier approaches required multiple stars (or a combination of stars and skymarks) in the FoV to fully determine camera attitude before position information could be acquired.

Note that additional sources, including satellite position and velocity errors, are included directly in the Kalman filter state. This allows the filter both to estimate errors over time in those quantities, and also to maintain an appropriately large covariance by appropriately accounting for all major error sources.

One means for improving the robustness of tracking, in cases where multiple objects of interest, such as stars and satellites, are available in successive frames, is the Global Nearest Neighbor (GNN) procedure, described, for example, in the context of radar tracking of multiple targets, by Blackman 2004. GNN allows identification of centroids coming from image processor 230 as likely objects of interest or, otherwise, as false alarms, that may then be discarded from further consideration. It has always been considered impossible, however, to apply a GNN procedure in the context of navigation of a platform prone to variation in attitude. Tight-coupling of IMU data with tracking data in the same recurrent filter, as suggested here for the first time, allows processor 206 to account for ownship motion and its effect on the locations of centroids in successive image frames. This may advantageously enable the tracker 235 to use low process noise in the track filters 303, thus more effectively discarding false alarms. ("Process noise" refers to the stochastic diffusion term in a state equation of a recursive filter, as fully described in Bar-Shalom 2001). Tracker 235 may also estimate the angular velocity of a tracked celestial object, which angular velocity is then used in object identification software 237 (shown in FIG. 2) to discriminate stars from satellites and to further refine the satellite identification.

Figure 4:
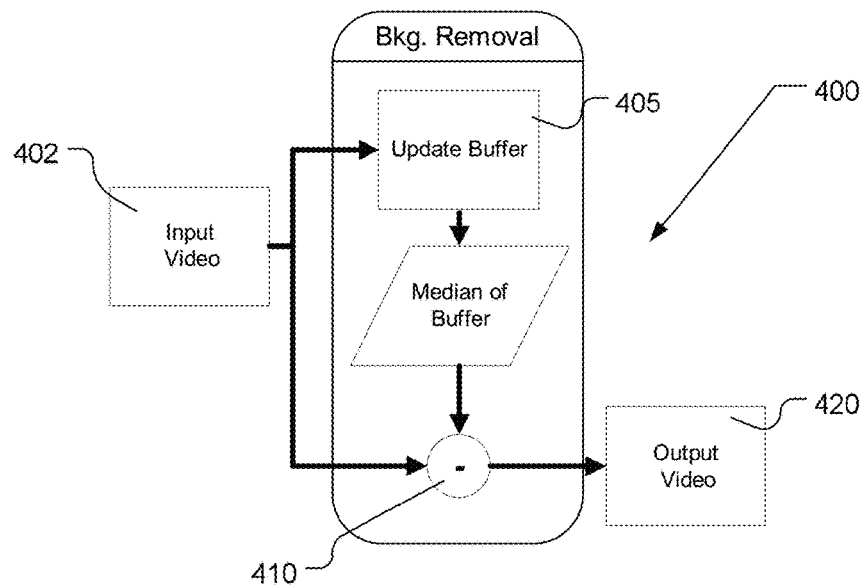
FIG. 4 is a schematic block diagram of a background removal system, according to an embodiment of the present invention.

It is now possible to implement a variety of techniques to process a succession of tracking images by virtue of the tight-coupling between skymark tracking data and IMU data, here taught for the first time. One such technique is that of a running median filter, designated generally by numeral 400 and now described with reference to FIG. 4.

Use of a Running Median Filter to Estimate and Remove Scene Background

During daytime operation, imaging system 200 sees a very significant level of background light due to Rayleigh scattering of sunlight by the atmosphere. This scattered light creates noise in the imaging system and make it difficult to find the image of a star or satellite. Running median filter 400 may be used to remove the background noise as follows: Sky data is collected as a series of images (a video stream, acquired at about 20-60 fps), which may be referred to as input video 402. These video images are buffered in a "frame buffer" containing about 10-100 images. As each new image is acquired, it is added to the frame buffer, and the oldest image is removed from the buffer and the buffer is updated (405). At the same time, an estimate of the background is formed by calculating, on a pixel-by-pixel basis, a median value 407 of all of the buffered images, and subtracting (410) this estimate from the most recent image, thereby generating a stream of median-subtracted frames, or output video. This approach is known as a running median filter, and is preferable to an average filter or exponential smoothing filter in rejection of spurious measurements.

Use of an Adaptive Noise Threshold, Including Limits

Stars and satellites can be found in the resulting image by first calculating a threshold value and flagging any pixel that has a value above that threshold as a candidate object. The threshold is typically estimated as a multiple of the standard noise value of all of the pixels in the image. However, in accordance with the present invention, it is important to do two things: a) limit the threshold value to be significantly above zero to avoid cases where saturated images, which have spuriously low noise values, end up with many pixels above the threshold, and b) estimate the image noise using a statistically robust estimate. An example of a robust noise estimate is the inter-quartile range (iqr). Use of a robust noise estimate avoids the effect of a bright star itself raising the threshold and preventing the detection of a celestial object such as a satellite in the image.

Grouping Adjacent Pixels to Constitute Candidate Objects

Pixels flagged as being above the threshold are grouped by an "image close" operation into candidate objects using an "image close" operation, thereby eliminating "islands" of pixels that are not flagged but are surrounded by ones that are. A "connected component" algorithm is applied to the image, giving each individual group of flagged pixels a common label. These groups are then centroided individually. These centroids are the best available estimate of the location of the object on the focal plane.

Figure 5:
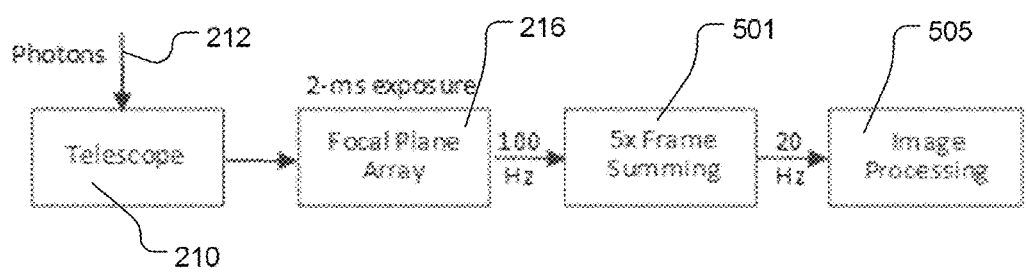
FIG. 5 is a schematic block diagram illustrating frame-stacking, according to an embodiment of the present invention.

Use of Digital Frame-Stacking Before Downstream Image Processing to Increase Effective Well Depth Integrating a celestial sighting system with an IMU, as suggested for the first time in the present invention, may be implemented using a real-time computer with a main update rate of, for example, 20 Hz (i.e., 50 ms between updates), which may not necessarily correspond to the rate of acquiring celestial images with camera 216. The simplest way to match the IMU update rate and camera frame rate might be to trigger the camera at the IMU frame rate (20 Hz, in the present example) and to set its exposure time to 2 ms, as now described with reference to the schematic illustration in FIG. 5. It is to be understood, however, that, in practice of the present invention, camera rates and IMU frame rates need not be commensurate. The remaining 48 ms of time in each cycle is not used; the photons are flushed. This is inefficient from a photon budget standpoint, but other approaches, such as varying the rate of the main loop to match the camera exposure time, run into complications in implementation of Nav filter 240 and become computationally challenging at the highest execution rates.

Should it become necessary to increase the signal in order to achieve a higher signal-to-noise ratio (SNR), it is possible to trigger camera 216 at a higher rate, for example about 100 Hz, and then to sum the exposures (501) to achieve a total desired exposure time before passing the summed image to the next stage 505 in the image processing chain. For instance, a system that used a 5× frame-summing approach would have an effective exposure time of about 10 ms per 20 Hz tick, and it would be expected to achieve a factor of about $\sqrt{5}$ higher SNR for the same aperture and sensor, a significant improvement that comes about merely from reduced photon wastage. Intra-cycle frame stacking, however, heightens requirements for focal plane readout speed and processing electronics.

Use of Image Shifting (Target Motion Compensation) Before Frame Stacking, Together with a Two-Stream Pipeline A typical sighting, using either the prior art SkyMark technique or else a technique that uses tight-coupling of IMU data and celestial tracking in accordance with embodiments of the present invention, will include both a star and a satellite in the same image. Insofar as the star and satellite are moving relative to each other, one of the two objects will appear as a "streak", i.e. it will be slightly smeared, due to the finite exposure time of the camera. This streaking is highly detrimental to the performance of the system, because the light from the object is less "concentrated." That is to say that photons from the streaked object are distributed over a larger number of detector pixels in the focal plane. Hence the image processing and detection algorithm will have to use a larger "acceptance window" in the focal plane, thus including more pixels and more attendant background noise into the detection step.

Figure 6:
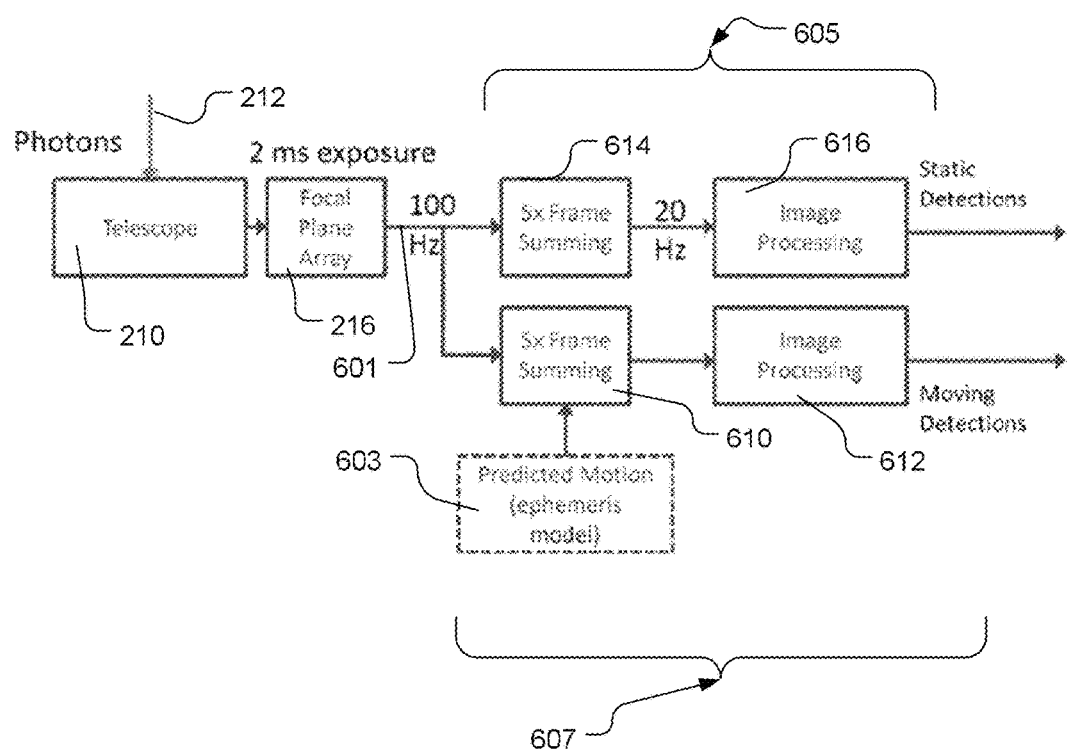
FIG. 6 is a schematic block diagram of two parallel frame-stacking pipelines, according to an embodiment of the present invention.

This problem may be avoided by making two parallel frame stacking pipelines, as now described with reference to an embodiment of the present invention schematically illustrated in FIG. 6. A common video stream 601 is generated by focal plane array 216 and fed into two parallel image processing pipelines, one of which, pipeline 607, uses a prediction 603 of the rate and direction of the expected motion of a tracked celestial object to shift the images back before summing them together in summer 610 and further image processing 612. This has the effect of eliminating much of the blurring, thus reducing the amount of background noise admitted to the detection step. A second pipeline 605, with a separate summer 614, and separate subsequent image processing 616, is used to detect and follow objects that appear static in the field of view. The first pipeline 607 follows the moving objects.

Use of a Global Nearest Neighbor (GNN) Tracking Algorithm, Fed with Ownship Motion Data from the IMU, to Improve Robustness of Object Tracking Tracker 235 (shown in FIG. 2) determines which of the centroids coming from the Image Processor 230 are likely to be objects of interest, i.e., stars and satellites, and which are likely to be false alarms. The centroids for likely objects of interest are passed on to be identified and the false alarms are discarded. Tracker 235 uses the output of a Compensation/Strapdown module 241 (shown in FIG. 2) to account for ownship motion and its effect on the centroid locations in the image frame. This enables Tracker 235 to use low process noise in the track filters, thus more effectively discarding false alarms. Tracker 235 also estimates the angular velocity of the celestial object, which is used in the identification software to discriminate stars from satellites and to further refine the satellite identification.

Multi-Hypothesis Navigation

Figure 7:
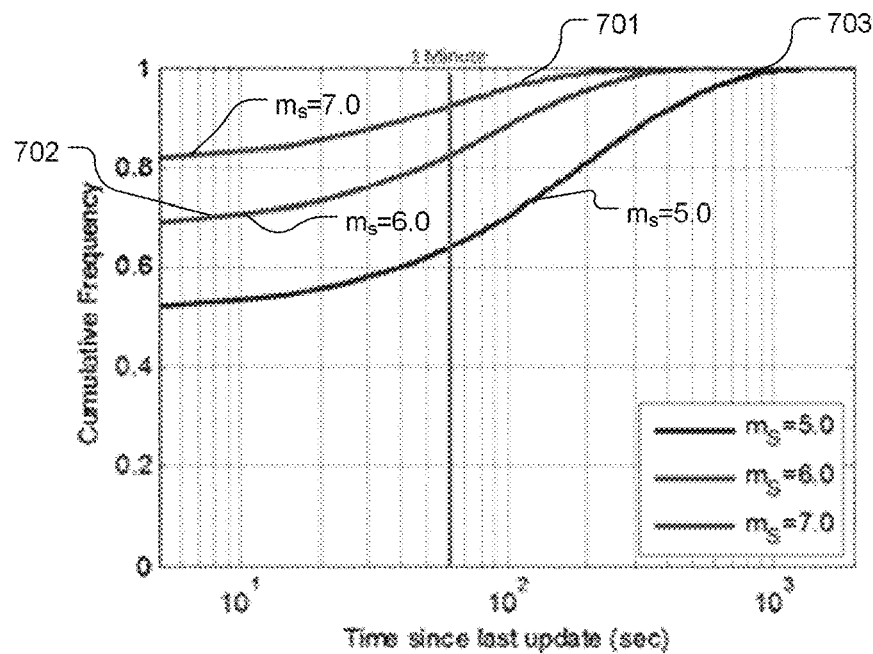
FIG. 7 is a graph illustrating cumulative distribution function of time since last update for three different apparent magnitudes.

The time between updates has a significant impact on navigation performance. To decrease the time between SkyMark updates, preferred embodiments of system detect celestial objects of higher and higher magnitudes, i.e., less bright. (For the conversion of observed energy flux to apparent magnitude, the standard reference is Matthews and Sandage, "*Optical Identification of 3C48, 3C196, and 3C286 with Stellar Objects,*" Ap. J., vol. 138, pp. 30-56, (1963), which is incorporated herein by reference. Referring to FIG. 7, the cumulative distribution function of time between updates is plotted in curves 701, 702 and 703, for three different magnitudes of satellites. As can be seen in FIG. 7, the apparent magnitude has a significant impact on the time between updates. For example, 80% of the time a magnitude 6 update becomes available within 50 seconds, whereas a magnitude 5 only becomes available within 200 seconds.

Figure 8:
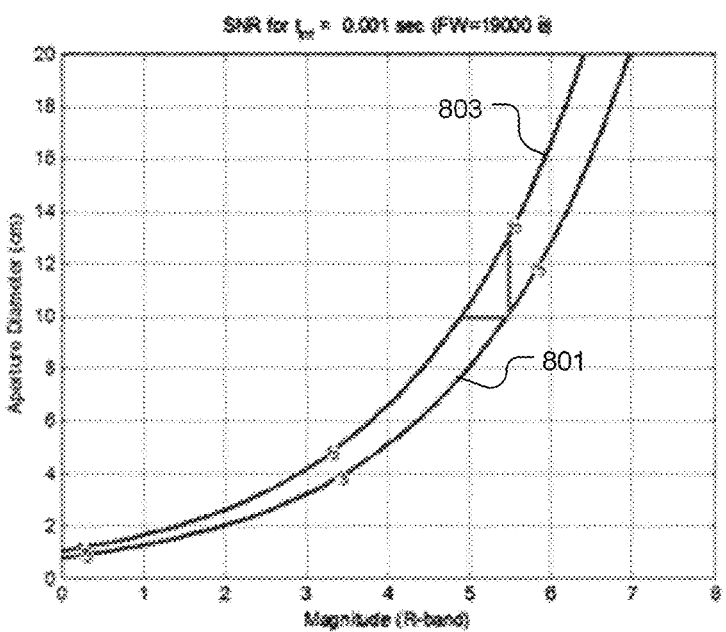
FIG. 8 is a graph illustrating signal-to-noise ratio (SNR) threshold for detection of objects as a function of aperture diameter and apparent magnitude.

The ability to detect objects depends on their apparent magnitude, the size of the aperture (as defined above), and the signal-to-noise ratio (SNR) threshold. Referring now to FIG. 8, which shows the aperture size (with the indicated scale assuming a particular telescope geometry) needed to detect objects in day time at sea level as a function of apparent magnitude for SNR thresholds of 3 (plot 801) and 5 (plot 803). As can be seen from FIG. 8, with an about 10 cm aperture, an object with an apparent magnitude of 5 or brighter will be visible in daylight. Using FIG. 7, this indicates that a SkyMark update would be available within one minute 64% of the time. If the system were able to detect an object with an apparent magnitude of 5.5, then a SkyMark update would be available within one minute approximately 75% of the time.

There are two ways to increase the update rate: increase the aperture size or decrease the SNR threshold. In the preceding example, a satellite with an apparent magnitude of 5.5 can be detected with an about 13 cm aperture and an SNR threshold of about 5 or with an about 10 cm aperture and an SNR threshold of about 3. Going from a 10 cm aperture to a 13 cm aperture is a 30% increase in size, which may not be acceptable in a tightly constrained size, weight and power (SWAP) situation.

Another approach is described here, namely lowering the SNR threshold to increase the number of objects that can be detected and hence decreasing the time between SkyMark updates. However, lowering the SNR threshold increases the probability of an incorrect assignment between a false alarm and a star or satellite. Thus, a robust multi-hypothesis navigator (MHN) solution is now described, to reduce the likelihood of navigation solution divergence due to an incorrect assignment between a detection and a star or satellite.

Figure 9:
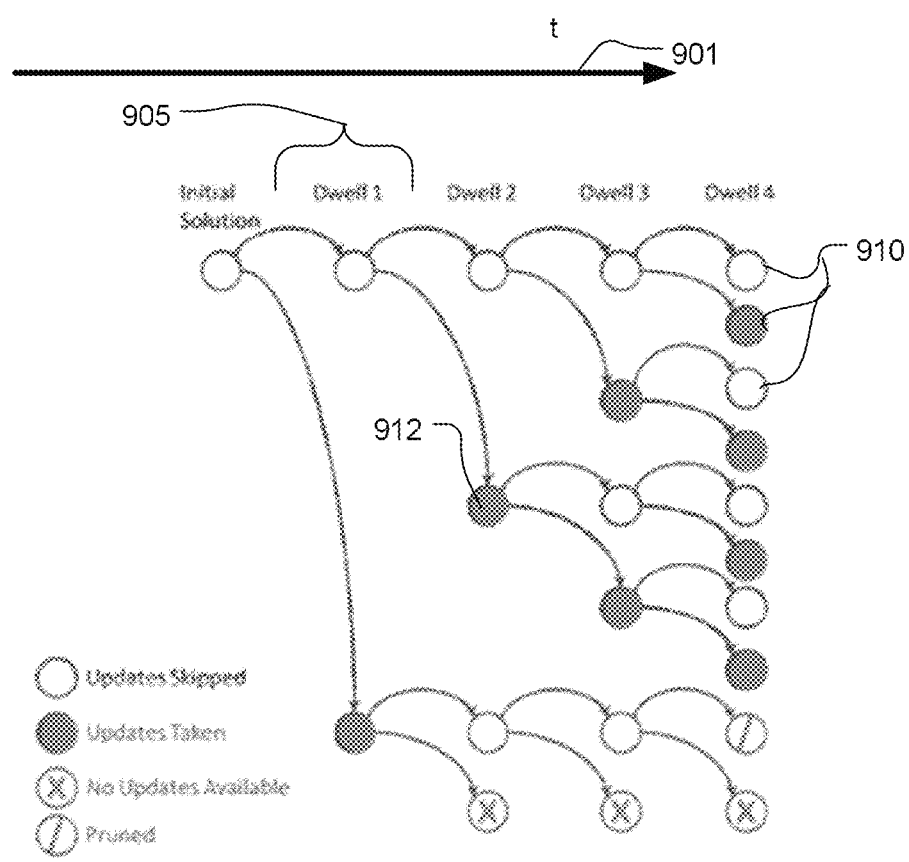
FIG. 9 is a schematic diagram illustrating a multi-hypothesis navigator branching example over four sensor dwells, according to an embodiment of the present invention.

Multi-Hypothesis Tracking (MHT), as proposed by Reid in 1979 and used extensively since then, may be directly leveraged to develop an MHN, now possible for the first time, by virtue of the tight coupling of tracking and attitude data, in accordance with embodiments of the present invention. This approach implements a discrete-dwell-based-sensor operation and navigation solution branching, as now described in detail with reference to FIG. 9. Time is shown increasing to the right, as indicated by arrow 901. During a dwell 905 (the period during which photons are accumulated on detector elements prior to a read), sensor 216 (shown in FIG. 2) is pointed, using beam steering mechanism 214 (shown in FIG. 2), in an inertially stabilized direction for about two to three seconds. During each single dwell, multiple image frames are collected and processed (as described above) through the navigation filter 240 (shown in FIG. 2), nominally at about 20 Hz. Multiple navigation solution branches 910 are tracked in parallel. At each dwell, some of the navigation solutions (shown as filled circles) are allowed to update using the image frames in the dwell and some (shown as empty circles) are not. That is, a new navigation solution branch 912 is created at each dwell, but not for each image frame within a dwell.

An important challenge with any multi-hypothesis approach is to mitigate the exponential growth of possible solutions. This is typically handled in MHT with a set of pruning algorithms and by limiting the "prune depth" or solution history. For MHN, many of the typical MHT pruning approaches apply directly, such as generalized pseudo Bayesian methods or clustering based on geometric or topological metrics. For an example of how pruning algorithms are applied in MHT, the reader is referred to Blackman & Popoli 2009.

Partial State Updates

Figure 2:
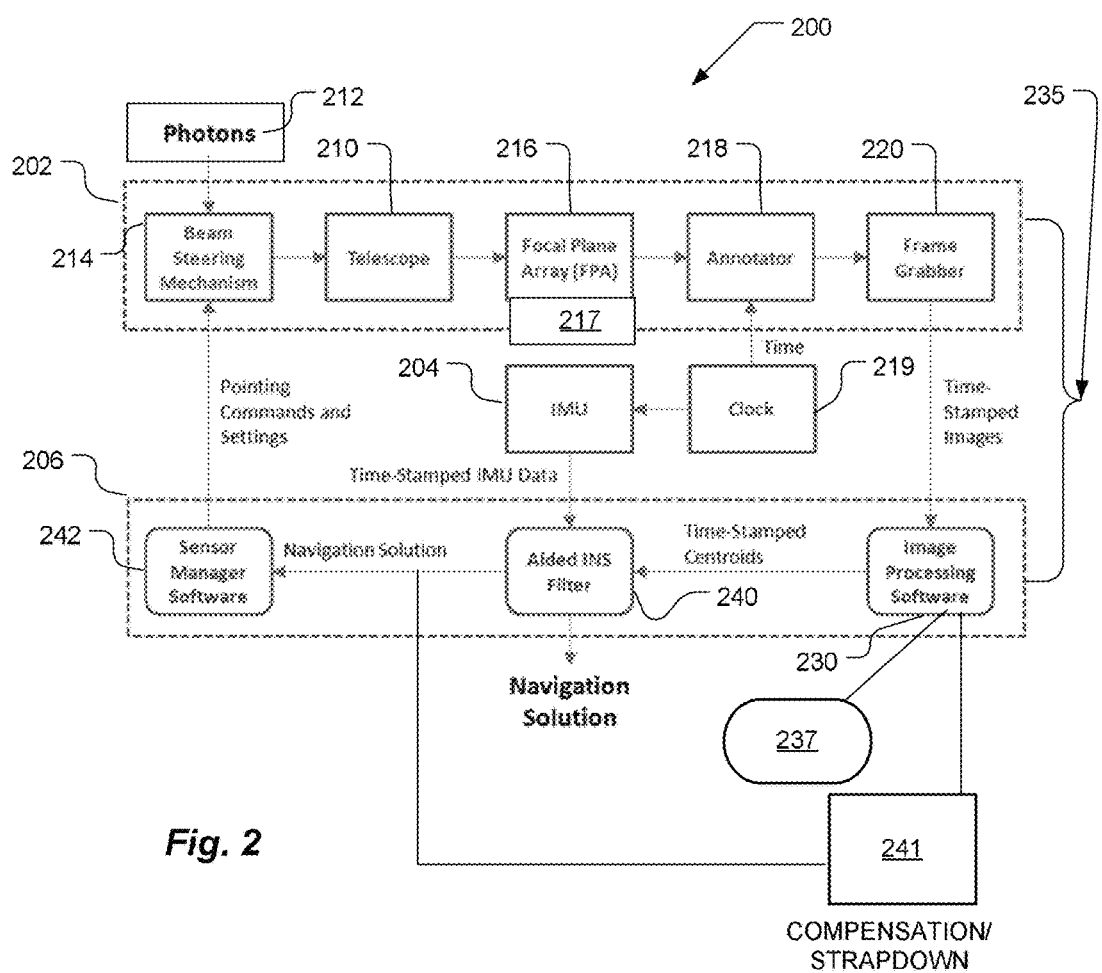
FIG. 2 is a schematic block diagram of a navigation system, according to an embodiment of the present invention.

Once the stars and satellites in the image have been identified, they may be used in Navigation Filter update software 305 (shown in FIG. 3) of the Navigation Filter 240 to correct the Navigation estimate 241 (shown in FIG. 2). Within the scope of the present invention, Navigation Filter Update 305 may use any recursive filter known in the art or subsequently developed. Preferred implementations employ a Partial State-Square Root Unscented Kalman Filter (PS-SRUKF), similar to well-known square root unscented Kalman filters, in which a subset of the state vector elements is used at each update. A partial state-square root unscented Kalman Filter has three key properties that make it ideal for a nonlinear measurement update in an aided inertial navigation solution:

Unscented Transform:

The unscented transform may be used to accurately handle the nonlinear camera measurement and its dependence on multiple rotation corrections such as camera to IMU misalignments. The unscented Kalman filter has been shown to be more accurate and robust than the extended Kalman filter. See, for example, Wan et al., *The unscented Kalman filter for nonlinear estimation," Adaptive Systems for Signal Processing, The IEEE 2000 Communications, and Control Symposium*, pp. 153-158 (2000), the entire contents of which are hereby incorporated herein, for all purposes.

Square Root:

A square root implementation is preferably used for three reasons. First, square root implementations are more numerically stable and accurate. Second, the square root implementation is computationally more efficient for unscented filtering, which requires the square root of the covariance to generate the unscented points. Third, it enables the partial state approach to be implemented through a single QR factorization. An example of a square root implementation is provided by Brunke et al., "*Square root sigma point filtering for real-time, nonlinear estimation*," J. Guidance, Control, and Dynamics, pp. 314-17 (2004), which is incorporated herein by reference.

Partial State:

The PS-SRUKF only uses the unscented transform for the portion of the navigation state that is used in the measurement update equation. This is ideal for navigation filtering, where only a small subset of the estimated states is needed for the measurement update. For example, the navigation filter may have many error states for things like biases, scale factors, and temperature sensitivities. However, none of those terms are a part of the measurement equation. The PS-SRUKF utilizes a permutation matrix and QR factorization to capture all cross correlations without requiring propagation of unscented points for all states.

Sensor Management and Optimization

An important aspect of the system is the management of sighting opportunities under cloud cover. The choice of pointing directions is driven by: 1) the improvement in navigation accuracy expected if the sighting is successful and 2) the expectation/probability that the sighting will be successful. The expected improvement in navigation accuracy can be quantified using the Shannon Information Gain (SIG). SIG provides a relative measure of information, and mathematically represents the difference between the covariance at the prediction stage, before measurement, and that at the update stage, after measurement update, according to:

$$SIG \equiv \Delta_{i,k} = -\frac{1}{2} \log |2\pi e^n \Sigma^*_{i,k+1}| - (-\frac{1}{2} \log |2\pi e^n \Sigma^p_{i,k+1}|) \quad \text{Eqn. (1)}$$

where $\Sigma^*_{i,k+1}$ is the updated covariance of state variable i at time step k+1, and $\Sigma^p_{i,k+1}$ is the corresponding propagated covariance, and n is the number of elements of the state vector. A derivation of the foregoing expression, based on evaluation of an expected value under the assumption of a Gaussian probability distribution function, may be found in Cover et al., *Elements of Information Theory*, Wiley-Interscience (2006), which is incorporated herein by reference. All quantities needed for this metric are readily available from recursive filter 240 (shown in FIG. 2).

To determine the probability that a particular sighting will be successful is dependent on the celestial object brightness and the amount of cloud obscuration. Therefore, it is desirable to quickly determine if a given line of sight is free from cloud obscuration. A co-sensor 217 (shown in FIG. 2) that operates in the medium wavelength infrared (MWIR) is a particularly effective way of determining the presence of clouds, and may be readily implemented using a simple photo-diode and can be expected to work in day- or nighttime. Note that a single-pixel photodiode is preferred, instead of a MWIR imaging system, because the co-sensor only has to answer a single question: "Is this line of sight obscured by clouds to the point that we wouldn't expect to see any stars?" An obscured line of sight has a higher brightness temperature, because clouds appear "warm" in the MWIR compared to clear sky, and a photodiode can provide such a measurement at much less expense than an imaging system. As part of the sensor management, cloud obscuration is determined using a small MWIR or long wavelength infrared (LWIR) photo-diode co-boresighted with the main optical sensor.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable, non-transitory storage media (e.g., read-only memory devices within a computer, such as ROM, or devices readable by a computer I/O attachment, such as CD-ROM or DVD disks), information alterably stored on tangible writable, non-transitory storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

We claim:

1. A method for establishing at least one of attitude, direction and position of a platform in motion in an inertial frame, the method comprising:
   a. optically imaging at least one skymark of known ephemeris at each of a first set of discrete instants by means of a sensor coupled to the platform to obtain successive skymark position vectors,
   wherein the successive skymark position vectors account for evolution of successive images between non-identical times;
   b. obtaining a measurement of attitude of the platform at each of a second set of discrete instants by means of an inertial navigation system;
   c. combining a first of the successive skymark position vectors and the measurement of attitude of the platform at one of the second set of discrete instants to obtain an estimate of platform navigation state; and
   d. applying a recursive estimation filter to successive skymark position vectors to update the estimate of platform navigation state;
   wherein the measurement of attitude of the platform is tightly coupled to the estimate of platform navigation state as updated by the recursive estimation filter; and
   wherein the successive images are spatially shifted based on a predicted motion.

2. A method in accordance with claim 1, wherein the second set of discrete instants substantially overlaps the first set of discrete instants.

3. A method in accordance with claim 1, wherein the recursive estimation filter is a Kalman filter.

4. A method in accordance with claim 1, wherein the recursive estimation filter is an unscented Kalman filter.

5. A method in accordance with claim 1, wherein the at least one skymark comprises at least one satellite.

6. A method in accordance with claim 1, wherein the predicted motion includes predicted motion of a skymark.

7. A method in accordance with claim 1, further comprising compensating for motion of the platform.

8. A method in accordance with claim 7, wherein the compensation for motion of the platform is based, at least in part, on the measurement of attitude of the platform.

9. A method in accordance with claim 1, further comprising separately summing successive image frames in parallel pipelines, wherein a first pipeline compensates for predicted motion and a second pipeline does not compensate for predicted motion.

10. A method in accordance with claim 9, wherein the predicted motion includes motion of a skymark.

11. A method in accordance with claim 9, wherein the predicted motion includes motion of the platform.

12. A method in accordance with claim 1, wherein applying a recursive estimation filter comprises updating a set of states of a state vector at successive instants.

13. A method in accordance with claim 12, wherein updating the set of states includes updating a proper subset of the set of states of the state vector.

14. A method in accordance with claim 12, wherein updating the set of states includes at least one of appending a state to the state vector and deleting a state from the state vector.

15. A method in accordance with claim 14, wherein appending a state to the state vector corresponds to entry of a satellite into a specified field of view.

16. A computer program product for use on a computer system for establishing at least one of attitude, direction and position of a platform in motion in an inertial frame, the computer program product comprising a non-transitory computer readable medium having computer readable program code fixed thereon, the computer readable program code including:
   a. program code for inputting an image of at least one skymark of known ephemeris at each of a first set of discrete instants by means of a sensor coupled to a platform to obtain successive skymark position vectors, wherein the successive skymark position vectors account for evolution of successive images obtained by optical imaging between non-identical times;
   b. program code for inputting a measurement of attitude of the platform at each of a second set of discrete instants;
   c. program code for combining a first of the successive skymark position vectors and the measurement of attitude of the platform at one of the second set of discrete instants to obtain an estimate of platform navigation state; and
   d. a recursive estimation filter adapted to update the estimate of platform navigation state,
   wherein the measurement of attitude of the platform is tightly coupled to the estimate of platform navigation state as updated by the recursive estimation filter; and
   wherein the successive images are spatially shifted based on a predicted motion.

17. A computer program product in accordance with claim 16, wherein the recursive estimation filter is a Kalman filter.

18. A computer program product in accordance with claim 16, wherein optically imaging includes frame stacking of successive images.

19. A computer program product in accordance with claim 16, wherein the computer-readable program code further comprises program code for separately summing successive image frames in parallel pipelines, wherein a first pipeline compensates for predicted motion and a second pipeline does not compensate for predicted motion.

* * * * *